UNITED STATES PATENT OFFICE.

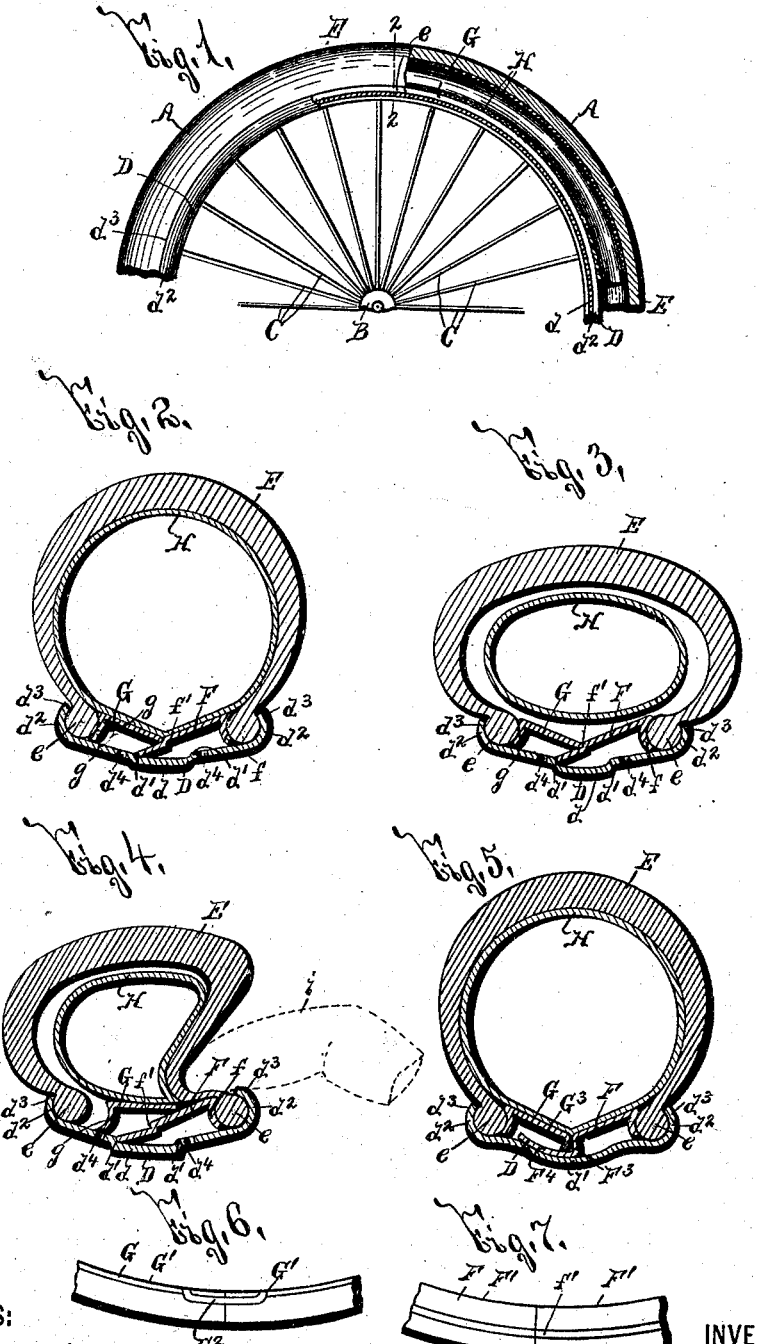

GEORGE B. OUT, OF SYRACUSE, NEW YORK, ASSIGNOR OF ONE-THIRD TO RUDOLPH C. VETTER, OF SAME PLACE.

WHEEL.

SPECIFICATION forming part of Letters Patent No. 502,447, dated August 1, 1893.

Application filed November 5, 1892. Serial No. 451,080. (No model.)

*To all whom it may concern:*

Be it known that I, GEORGE B. OUT, of Syracuse, in the county of Onondaga, in the State of New York, have invented new and useful Improvements in Wheels, of which the following, taken in connection with the accompanying drawings, is a full, clear, and exact description.

My invention relates to improvements in vehicle wheels, and more particularly to those designed for bicycles or velocipedes, and has for its object the production of a simple, practical, economical, and effective construction in which the tire is easily removed and replaced; and to this end it consists, essentially, in a tire formed with separated edges, a rim having side shoulders for engaging the outer faces of the tire edges, a pair of bands encircling the rim and having their adjacent edges interlocked and their outer edges provided with shoulders for engaging the inner faces of the tire edges, and a pneumatic sack between said tire and bands.

The invention furthermore consists in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a side elevation, partly in section, of the detached upper extremity of my improved wheel. Fig. 2 is a transverse vertical sectional view, taken on line —2—2—, Fig. 1. Fig. 3 is a sectional view similar to Fig. 2, the pneumatic sack between the tire and bands being shown as but partly distended. Fig. 4 is also a sectional view similar to Fig. 2, representing one of the bands encircling the rim as in its position assumed when being forced to its operative position. Fig. 5 is a detail elevation of a portion of the band shown at Fig. 4 as in its inoperative position. Fig. 6 is a similar detail elevation of a portion of the other band encircling the rim or felly, and Fig. 7 is a transverse sectional view of a modified form of my invention.

My improved wheel —A— is composed of a hub —B—, spokes —C—, a rim or felly —D—, a tire —E—, bands —F—G— for securing the tire to the rim, and a pneumatic sack —H—. The hub —B— and spokes —C— may be of any desirable form, size, and construction, and, as they form no part of my present invention, it is unnecessary to further illustrate or describe the same.

The rim —D— is formed with a central portion —d— of less diameter than the remaining portion thereof, and with outwardly inclining shoulders —d'—d'— at the edges of said central portion. The portions of the rim —D— on opposite sides of the shoulders —d'—d'— incline outwardly from said shoulders, and are provided at their outer longitudinal edges with outturned shoulders —$d^2$—$d^2$— having inwardly curved edges —$d^3$—$d^3$—.

The tire —E— may be of any desirable form, size, and construction, and is provided with separated thickened edges —e—e— of rounding cross section, the outer faces of which are normally engaged by the shoulders —$d^2$—$d^2$—, as best seen at Figs. 2, 3, and 4.

The bands —F—G— in cross section incline inwardly from their outer edges, and are formed respectively at said outer edges with inwardly extending shoulders —f—g— of rounding cross section for engaging the inner faces of the thickened tire edges —e—e—. The inner edge of the band —F— bears against one of the shoulders —d'—, and said band is formed in proximity to said inner edge with an engaging shoulder —f'—. The inner edge of the band —G— bears normally against the shoulder —f'—, and it is, therefore, evident that the inner edges of these bands —F— and —G— are interlocked together, and are supported by the adjacent portion of the rim or felly —D—, and that their outer ends, in connection with the shoulders —$d^2$—$d^2$— of the rim —D—, serve to effectually and practically hold in position the thickened edges of the tire —E—.

In order that the bands —F—G— may be readily placed in position upon the rim —D—, they are preferably broken or open, as shown at Figs. 5 and 6. They are also preferably formed of spring metal, and their adjacent ends —F'—F'—G'—G'— are normally in close proximity, although they are free to separate as the bands are placed upon the rim —D—, and the ends of the band —G— are free to separate as said band is moved crosswise of the band —F— into and out of its normal position. The ends of the band —G— may be secured together by a suitable tie —G²—, Fig. 5, which may be applied to the band —G— after it is secured in its normal position.

To permit application of the tie —G²— the rim or felly —D— is provided with an opening not necessary to illustrate, through which the tie is readily inserted and easily engaged when desired to place it in position or remove it from the band —G—.

The pneumatic sack —H— may be of any desirable construction, and, when inflated, bears against the outer faces of the bands —F—G— and the inner face of the tire —E—.

In practically assembling my improved invention the band —F— and the band —G— lapped thereupon, as shown at Fig. 4, are placed upon the rim —D—, and one edge —e— of the tire —E— is inserted between one of the shoulders —d²— on the rim —D— and the adjacent shoulder —f— of the band —F—. The band —F— is then forced to its normal position, the sack —H— is placed within the tire —E—, and the opposite edge —e— of the tire —E— is then placed on the inside of the opposite edge —d²—, whereupon the operator's finger —i— is pressed firmly against the opposite face of the tire for sliding the band —G— crosswise of the band —F— into its normal position, whereupon its inner edge automatically engages the shoulder —f'—. The pneumatic sack —H— is then inflated in the usual manner, and my improved tire is then in its normal operative condition.

To remove the tire —E—, the air within the sack —H— is permitted to escape in the usual manner, and a wire or other similar instrument is inserted through perforations —d⁴— in the rim —D— into engagement with the band —G— for forcing the same outward and disengaging it from the shoulder —f'—, and sliding said band crosswise of the band —F—, whereupon one edge of the tire —E— is easily removed, the band —G— forced from engagement with the shoulder —d'—, and the opposite edge of the tire —E— readily disengaged from the band —G— and the adjacent rim shoulder —d²—.

At Fig. 7 I have shown a modified form of my invention, provided with a band —F— formed at its inner edge with an inwardly extending shoulder —F³—, and an annular curved shoulder —F⁴— extending laterally from the shoulder —F³—, and with a band —G— formed with an inwardly extending shoulder —G³— having its inner face bearing against the corresponding face of the shoulder —F³— and its lower edge against the outer face of the shoulder —F⁴—.

My invention is cheaply manufactured, is readily assembled, and is practical and efficient. It will be understood, however, that I do not herein limit myself to the detail construction and arrangement of its parts, as the same may be somewhat varied without departing from the spirit of my invention.

Having thus fully described my invention, what I claim as new, and desire to secure by Letters Patent, is—

1. In a wheel, a tire having separated edges, a rim having side shoulders for engaging the outer faces of the tire edges, and a pair of bands encircling the rim and having their adjacent sides interlocked and their outer edges provided with shoulders for engaging the inner faces of the tire edges, substantially as and for the purpose set forth.

2. In a wheel, a tire having separated thickened edges, a rim having side shoulders for engaging the outer faces of said thickened tire edges, a pair of bands encircling the rim and having their adjacent sides interlocked and their outer edges provided with shoulders for engaging the inner faces of the tire edges, and an inflated pneumatic sack between the tire and the bands, substantially as and for the purpose specified.

3. In a wheel, a tire having separated edges, a rim having side shoulders for engaging the outer faces of the tire edges, a band encircling the rim and having its outer edge provided with a shoulder for engaging the inner face of the adjacent tire edge and having its opposite edge bearing against the outer face of the rim, and a second band encircling the rim and having its outer edge provided with a shoulder for engaging the inner face of the opposite tire edge and having its opposite edge bearing against the outer face of the adjacent side of the former band, substantially as and for the purpose set forth.

4. In a wheel, a tire having separated edges, a rim having side shoulders for engaging the outer faces of the tire edges, and a pair of bands encircling the rim and inclining inwardly from their outer edges toward the adjacent face of the rim and having their adjacent edges interlocked and their outer edges provided with shoulders for engaging the inner faces of the tire edges, substantially as and for the purpose specified.

5. In a wheel, a tire having separated edges, a rim having side shoulders for engaging the outer faces of the tire edges, a band encircling the rim and having its outer edge provided with a shoulder for engaging the inner face of the adjacent tire edge and having its opposite edge bearing against the outer face of the rim and formed with a shoulder on its outer face in proximity to said opposite edge, and a second band encircling the rim and having its outer edge provided with a shoulder for engaging the inner face of the opposite tire edge and having its opposite edge bearing against said shoulder formed in proximity to the adjacent edge of the former band, substantially as and for the purpose set forth.

6. In a wheel, a tire having separated edges, a rim having side shoulders for engaging the outer faces of the tire edges and formed with an inwardly extending shoulder at its central portion, a band encircling the rim and having its outer edge provided with a shoulder for engaging the inner face of the adjacent tire edge and having its opposite edge bearing against the inwardly extending shoulders upon the outer face of the rim, and a second band encircling the rim and having its outer edge provided with a shoulder for engaging the inner face of the opposite tire edge and having its opposite edge bearing against the outer face of the adjacent side of the former band, substantially as and for the purpose specified.

7. In a wheel, a tire having separated edges, a rim having side shoulders for engaging the outer faces of the tire edges, and a pair of broken bands encircling the rim and formed of spring metal and having the edges of their adjacent ends movable toward and away from each other, said bands encircling the rim and having their adjacent sides interlocked and their outer edges provided with shoulders for engaging the inner faces of the tire edges, substantially as and for the purpose described.

8. In a wheel, a tire having separated edges, a rim having side shoulders for engaging the outer faces of the tire edges, a pair of broken bands encircling the rim and formed of spring metal and having the edges of their adjacent ends movable toward and away from each other, said bands encircling the rim and having their adjacent sides interlocked and their outer edges provided with shoulders for engaging the inner faces of the tire edges, and a tie for engaging the adjacent ends of one of said bands, substantially as and for the purpose specified.

In testimony whereof I have hereunto signed my name, in the presence of two attesting witnesses, at Syracuse, in the county of Onondaga, in the State of New York, this 29th day of October, 1892.

GEORGE B. OUT.

Witnesses:
CLARK H. NORTON,
M. BAXTER.